United States Patent
Fukada

(10) Patent No.: US 6,502,023 B1
(45) Date of Patent: Dec. 31, 2002

(54) DEVICE FOR ESTIMATING ROLLING CONDITION OF VEHICLE BODY WITH LIMITS OF ROLL ANGLE AND ANGULAR SPEED

(75) Inventor: Yoshiki Fukada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/245,711

(22) Filed: Feb. 8, 1999

(30) Foreign Application Priority Data

Mar. 6, 1998 (JP) .............................. 10-071201

(51) Int. Cl.$^7$ ................ B60G 23/00; B62C 3/00; B62K 25/00; G06F 17/00
(52) U.S. Cl. ................ 701/38; 701/37; 701/72; 701/91; 280/5.502; 280/5.506; 280/5.507
(58) Field of Search .............. 701/37, 38, 72, 701/91; 280/5.502, 5.506, 5.507

(56) References Cited

U.S. PATENT DOCUMENTS

| | | | |
|---|---|---|---|
| 4,625,993 A | * 12/1986 | Williams et al. | 280/707 |
| 4,803,627 A | 2/1989 | Yasuike et al. | |
| 4,807,128 A | 2/1989 | Ikemoto et al. | |
| 4,809,176 A | 2/1989 | Oowa et al. | |
| 5,016,910 A | 5/1991 | Nagai | 280/707 |
| 5,054,813 A | 10/1991 | Kakizaki | |
| 5,134,352 A | 7/1992 | Matsumoto et al. | 318/587 |
| 5,172,961 A | 12/1992 | Inoue et al. | 303/100 |
| 5,229,944 A | 7/1993 | Yasuno | 701/70 |

(List continued on next page.)

FOREIGN PATENT DOCUMENTS

| | | |
|---|---|---|
| DE | 195 36 629 A1 | 4/1997 |
| DE | 196 38 280 A | 3/1998 |
| DE | 197 47 144 A | 6/1998 |
| EP | 0 237 919 A | 9/1987 |
| EP | 0 348 817 A | 1/1990 |
| EP | 0 412 530 A | 2/1991 |
| EP | 0 765 787 A2 | 8/1996 |
| EP | 0 285 153 A | 10/1998 |
| JP | A-63-116918 | 5/1988 |
| JP | A-2-70561 | 3/1990 |
| JP | A-3-70614 | 3/1991 |
| JP | A-6-297985 | 10/1994 |
| JP | A-10-81215 | 3/1998 |

Primary Examiner—William A. Cuchlinski, Jr.
Assistant Examiner—Brian J Broadhead
(74) Attorney, Agent, or Firm—Oliff & Berridge, PLC

(57) ABSTRACT

A device for estimating a rolling condition of a body of a vehicle having: a unit for estimating a first quantity ($\phi$, $\gamma V$, Gy, Ff) corresponding to roll angle ($\phi$) of the vehicle body around a rolling axis; a unit for estimating a second quantity corresponding to a change rate ($\dot\phi$) of the roll angle of the vehicle body; a unit for estimating a third quantity indicating a relative magnitude ($\phi/\phi_{limit}$, $\gamma V/(\gamma V)_{limit}$, $Gy/Gy_{limit}$, $Ff/Ff_{limit}$) of the first quantity with reference to a first limit value predetermined therefor; a unit for estimating a fourth quantity indicating a relative magnitude ($\dot\phi/\dot\phi_{limit}$) of the second quantity with reference to a second limit value predetermined therefor; and a unit for estimating the rolling condition as a combination of the third and fourth quantities such that the rolling condition is intensified along with increase of the third quantity as well as increase of the fourth quantity.

9 Claims, 5 Drawing Sheets

U.S. PATENT DOCUMENTS

| | | | |
|---|---|---|---|
| 5,344,224 A | 9/1994 | Yasuno | 303/111 |
| 5,640,324 A | 6/1997 | Inagaki | |
| 5,673,981 A | 10/1997 | Higashimata et al. | 303/155 |
| 5,700,073 A | 12/1997 | Hiwatashi et al. | 303/146 |
| 5,707,119 A | 1/1998 | Monzaki | 303/146 |
| 5,732,371 A | 3/1998 | Fujita | 701/38 |
| 5,772,289 A | 6/1998 | Nakazawa et al. | 303/9.09 |
| 5,816,669 A | 10/1998 | Hiwatashi et al. | 303/140 |
| 5,822,709 A | 10/1998 | Fujita | 701/70 |
| 5,839,800 A | 11/1998 | Koga et al. | 303/152 |
| 5,850,616 A | 12/1998 | Matsuno et al. | 701/82 |
| 5,863,105 A | 1/1999 | Sano | 303/146 |
| 5,869,943 A | 2/1999 | Nakashima et al. | 318/586 |
| 5,890,084 A * | 3/1999 | Halasz et al. | 701/45 |
| 5,899,952 A | 5/1999 | Fukada | 701/74 |
| 5,913,578 A | 6/1999 | Tozu et al. | 303/140 |
| 5,915,800 A | 6/1999 | Hiwatashi et al. | 303/146 |
| 5,941,334 A | 8/1999 | Inagaki | 180/242 |
| 5,974,221 A | 10/1999 | Kato et al. | 386/68 |
| 6,002,974 A * | 12/1999 | Schiffmann | 701/36 |
| 6,002,975 A * | 12/1999 | Schiffmann et al. | 701/36 |
| 6,038,495 A * | 3/2000 | Schiffmann | 701/1 |
| 6,074,020 A | 6/2000 | Takahashi et al. | 303/146 |
| 6,104,284 A * | 8/2000 | Otsuka | 340/440 |
| 6,139,120 A * | 10/2000 | Fukada | 303/146 |
| 6,154,697 A * | 11/2000 | Otsuka | 701/45 |
| 6,192,305 B1 * | 2/2001 | Schiffmann | 180/271 |

* cited by examiner

DEVICE FOR ESTIMATING ROLLING CONDITION OF VEHICLE BODY WITH LIMITS OF ROLL ANGLE AND ANGULAR SPEED

BACKGROUND OF THE INVENTION

1. Field of the Invention

The present invention relates to a system for estimating a rolling condition of a vehicle such as an automobile.

2. Description of the Prior Art

When a vehicle such as an automobile is driven to turn along a curved course, its body flexibly supported above its wheels via elastic suspensions inclines outside of the turn according to a centrifugal force acting virtually at the center of gravity of the vehicle body.

A parameter which indicates how far the vehicle body is proceeding in such a rolling movement is useful for automatic behavior controls of vehicles such as an automatic suspension control for automatically varying the spring constant and/or the damping coefficient of the suspensions, a vehicle stability control for automatically braking a selected one or more of pairs of front and rear wheels so as particularly to stabilize the turning performance of the vehicles. It would also be desirable for a driver of a vehicle if the vehicle is equipped with an indicator for indicating to the driver when such a rolling of the vehicle body due to the turning centrifugal force is imminent.

In Japanese Patent Laid-open Publication 6-297985, it has been proposed to estimate the roll angle of a body of a four wheeled vehicle based upon three displacement sensors provided to detect a displacement of each of three wheels selected from the four wheels relative to the vehicle body and a lateral acceleration sensor, such that a three dimensional position of a virtual plane traversing three fixed points of the vehicle body relative to the ground surface is calculated based upon the output of the three displacement sensors by solving three one-dimensional three variables simultaneous equations so as thereby to determine the height of the center of gravity of the vehicle body above the ground surface, and a torque for rolling the vehicle body is calculated by multiplying the height with the mass of the vehicle body and an output of the lateral acceleration sensor. According to the invention described in this publication, the vehicle is automatically braked when the roll angle exceeds a predetermined threshold value.

In Japanese Patent Laid-open Publication 63-116918, it has been proposed to estimate a rolling condition of a vehicle based upon load sensors for detecting loads of actuators provided for respective wheels, a vehicle speed sensor, a steering angle sensor, displacement sensors and an acceleration sensor. According to the invention described in this publication, the estimated rolling condition is shown to the driver by an indicator, and when the rolling condition exceeds an allowable limit, the vehicle is automatically braked, with execution of an engine slow down.

In Japanese Patent Laid-open Publication 3-70614, it has been proposed to estimate roll angle of a vehicle body by assuming a vehicle as a simple harmonic rotary oscillation system, such that the roll angle of the vehicle body is obtained as a solution for the rotational angle of the simple harmonic rotary oscillation equation based upon displacements of the vehicle body detected at front left, rear left, front right and rear right wheels and a lateral acceleration detected by a lateral acceleration sensor. According to the invention of this publication, the roll angle thus estimated is supplied to a control unit for controlling active suspensions of the four wheels, together with other input parameters such as vehicle speed, pitch angle of the vehicle body, pressure of a main tank of the control system, etc.

SUMMARY OF THE INVENTION

The present application contemplates that in evaluating the rolling of a vehicle body caused by a turn running thereof, it will be worthwhile to estimate it as a "rolling condition" indicative of how close the rolling is momentarily approaching to a limit thereof allowable for ensuring a stabilized running of the vehicle.

In is therefore a primary object of the present invention to provide a device for estimating such a "rolling condition" of the vehicle body that is indicative of how close the rolling is momentarily approaching to an allowable limit thereof so as to ensure a stabilized running of the vehicle, wherein the rolling condition is not a mere roll angle of the vehicle body but a quantity which is informative of the current rolling state in reflection of its allowable limit and in connection with an urgency of counteracting thereagainst.

In order to accomplish such a primary object, the inventor proposes a device for estimating a rolling condition of a body of a vehicle having the vehicle body, a pair of front wheels, a pair of rear wheels, and suspension means for supporting the vehicle body on the pairs of front and rear wheels, the vehicle body being able to roll relative to the wheels around a virtual axis of rolling provided by the suspension means, the device comprising:

- means for estimating a first quantity corresponding to roll angle of the vehicle body around the rolling axis;
- means for estimating a second quantity corresponding to a change rate of the roll angle of the vehicle body;
- means for estimating a third quantity indicating a relative magnitude of the first quantity with reference to a first limit value predetermined therefor;
- means for estimating a fourth quantity indicating a relative magnitude of the second quantity with reference to a second limit value predetermined therefor; and
- means for estimating the rolling condition as a combination of the third and fourth quantities such that the rolling condition is intensified along with increase of the third quantity as well as increase of the fourth quantity.

The above-mentioned device according to the present invention, when it comprises at least one selected from the group consisting of means for detecting lateral acceleration Gy of the vehicle body, a combination of means for detecting yaw rate γ of the vehicle body and means for detecting vehicle speed V, and a combination of means for detecting yaw rate γ of the vehicle body and means for detecting lateral acceleration Gy, may be constructed such that the second quantity estimation means comprise means for cyclically conducting such calculations as $$\dot{\phi}(t+\Delta t) = \dot{\phi}(t) + \{\omega_o^2(\gamma V \phi_o - \phi(t)) - 2\omega_o \zeta \dot{\phi}(t)\}\Delta t \text{ and}$$

$$\phi(t+\Delta t) = \phi(t) + \dot{\phi}\Delta t$$

at a minute cycle time $\Delta t$ of time t so as to cyclically renew values of $\dot{\phi}$ and $\phi$ by respective newly calculated values thereof and to estimate the third quantity by dividing each instant value of $\dot{\phi}$ by a limit value $\dot{\phi}_{limit}$ predetermined therefor as an allowable limit thereof, wherein $\phi$ is the roll angle of the vehicle body around the rolling axis, $\dot{\phi}$ is change rate of the roll angle $\phi$, $\omega_o$ is a natural frequency of the vehicle body in rolling around the rolling axis in oscillation, X is either the lateral acceleration Gy, $\gamma$V or Ff representing (I$\dot{\gamma}$+LrMGy)/H, $\phi_o$ is a roll angle induced in the vehicle body by a unit lateral acceleration applied thereto, and $\zeta$ is a damping coefficient in the rolling of the vehicle body around the rolling axis, while I, Lr, M and H are the inertial moment of the vehicle body in yawing around the center of gravity thereof, a distance between the axis of the rear wheels and the center of gravity of the vehicle body, the mass of the vehicle body, and the wheel base of the vehicle, respectively.

According to the optional provision of the means for detecting the yaw rate $\gamma$, the means for detecting the vehicle speed V, and/or the means for detecting the lateral acceleration Gy, the means for estimating the third quantity may estimate the third quantity as either $\gamma$V/($\gamma$V)$_{limit}$ by dividing each instant value of a product of $\gamma$ and V by a limit value ($\gamma$V)$_{limit}$ predetermined therefor as an allowable limit thereof, Gy/Gy$_{limit}$ by dividing each instant value of Gy by a limit value Gy$_{limit}$ predetermined therefor as an allowable limit thereof, Ff/Ff$_{limit}$ by dividing each instant value of Fy by a limit value Ff$_{limit}$ predetermined therefor as an allowable limit thereof, or a weighted combination of $\gamma$V/($\gamma$V)$_{limit}$, Gy/Gy$_{limit}$, and Ff/Ff$_{limit}$ according to the running conditions and/or road conditions.

The means for estimating the third quantity may also estimate the third quantity as $\phi/\phi$ limit by dividing each instant value of $\phi$ in the cyclical calculation by a limit value $\phi_{limit}$ predetermined therefor as an allowable limit thereof.

BRIEF DESCRIPTION OF THE DRAWINGS

In the accompanying drawings.

DESCRIPTION OF THE EMBODIMENTS

In the following, the present invention will be described in more detail in the form of some preferred embodiments with reference to the accompanying drawings.

Figure 1:
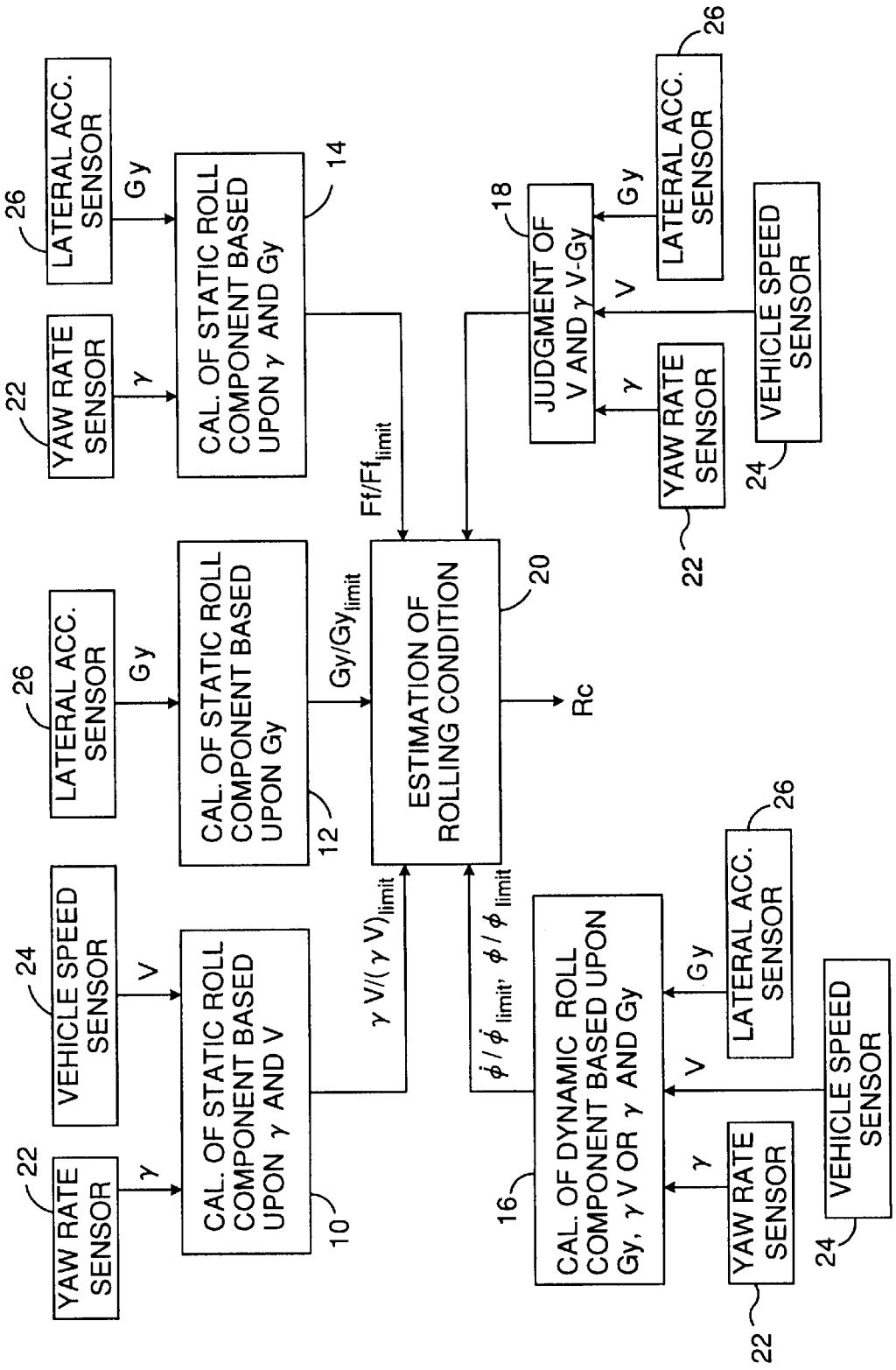
FIG. 1 is a diagram showing a general functional construction of the rolling condition estimation device according to the present invention, wherein several aspects of embodiments are incorporated together for selective use to construct respective embodiments such as described in detail hereinunder.

Referring to FIG. 1, the rolling condition estimation device according to the present invention is diagrammatically shown as incorporating several embodiments thereof altogether in combination for the convenience of illustration. In the figure, there are provided such sensors as a yaw rate sensor 22 for detecting yaw rate $\gamma$ of a vehicle body of a vehicle not shown in the figure, a vehicle speed sensor 24 for detecting vehicle speed V of the vehicle, and a lateral acceleration sensor 26 for detecting lateral acceleration Gy of the vehicle body. In the figure, these sensors are shown in plurality also only for the convenience of illustration.

The device may comprise a calculation block 10 adapted to be supplied with the yaw rate $\gamma$ and the vehicle speed V from the yaw rate sensor 22 and the vehicle speed sensor 24, respectively, to calculate a product of yaw rate and vehicle speed, i.e. $\gamma$V, and to divide $\gamma$V by the aforementioned limit value ($\gamma$V)$_{limit}$ predetermined therefor, so as to output $\gamma$V/($\gamma$V)$_{limit}$ as a quantity (third quantity) for evaluating the magnitude of the product of the yaw rate and the vehicle speed to be representative of the roll angle induced thereby in reflection of an allowable limit thereof.

The device may also or alternatively comprise a calculation block 12 adapted to be supplied with the lateral acceleration Gy detected by the lateral acceleration sensor 26, and to divide Gy by the aforementioned limit value Gy$_{limit}$ predetermined therefor, so as to output Gy/Gy$_{limit}$ as a quantity (third quantity) for evaluating the magnitude of the lateral acceleration actually measured by the lateral acceleration sensor 26 to be representative of the roll angle induced thereby in reflection of an acceptable limit thereof.

The device may also or alternatively comprise a calculation block 14 adapted to be supplied with the yaw rate $\gamma$ and the lateral acceleration Gy from the yaw rate sensor 22 and the lateral acceleration sensor 26, respectively, to calculate Ff=(I$\dot{\gamma}$+LrMGy)/H as a lateral force acting at the pair of front wheels based upon the change rate $\dot{\gamma}$ and the lateral acceleration Gy, and to divide Ff by the aforementioned limit value Ff$_{limit}$ predetermined therefor, so as to estimate Ff/Ff$_{limit}$ as a quantity (third quantity) for evaluating the lateral force acting at the pair of front wheels to be representative of the roll angle induced thereby in reflection of an acceptable limit thereof.

Comparing the quantities $\gamma$V/($\gamma$V)$_{limit}$, Gy/Gy$_{limit}$ and Ff/Ff$_{limit}$ output from the calculations blocks 10, 12 and 14, respectively, $\gamma$V/($\gamma$V)$_{limit}$ is earlier than Gy/Gy$_{limit}$ in the phase of changing and will also be generally earlier than Ff/Ff$_{limit}$ in the phase of changing, while Ff/Ff$_{limit}$ is earlier than Gy/Gy$_{limit}$ in the phase of changing. However, $\gamma$V is liable to a discrepancy from the lateral acceleration Gy detectable by the lateral acceleration sensor such as $\Delta$Gy= $\gamma$V–Gy when the vehicle is running at a high speed and/or such as Gy$\cos\theta$ ($\theta$ is an angle of lateral inclination of the road surface) when the vehicle is running along a laterally inclined road surface. As will be appreciated from the descriptions made hereinunder with reference to the flowchart of FIGS. 2–6, the rolling condition estimation device according to the present invention may be constructed by using only one or two or more of the calculation blocks 10, 12 and 14 in combination for the calculation of the third quantity, or even with none of the calculation blocks 10, 12 and 14 by, instead, depending on a calculation block 16 described hereinunder.

The device further comprises the calculation block 16 adapted to be supplied with at least one selected from the group consisting of the lateral acceleration Gy, a combination of the yaw rate $\gamma$ and the vehicle speed V and a combination of the $\gamma$ and the lateral acceleration Gy detected by the corresponding yaw rate sensor 22, vehicle speed sensor 24 and lateral acceleration sensor 26, and to calculate the change rate of the roll angle by assuming the vehicle body suspended on the pairs of front and rear wheels via the suspension means as a simple harmonic rotary oscillation system in which the movement of the vehicle body is expressed by the following equation:

$$\ddot{\phi}=\omega_o^2(X\phi_o-\phi)-2\omega_o\zeta\dot{\phi}$$

wherein $\phi$ is the roll angle of the vehicle body around the rolling axis, $\dot{\phi}$ is the change rate of the roll angle $\phi$, $\phi_o$ is a natural frequency of the vehicle body in rolling around the rolling axis, X is a lateral acceleration applied to the center of gravity of the vehicle body, $\phi_o$ is a roll angle induced in the vehicle body by a unit magnitude of X, and $\zeta$ is a damping coefficient in the rolling movement of the vehicle body around the rolling axis. X may be either $\gamma V$, Gy, Ff, i.e. $(I\dot{\gamma}+L_rMGy)/H$, or a weighted combination of these parameters.

The above equation is solved to obtain $\dot{\phi}$ by a microcomputer by which the rolling condition estimation device according to the present invention is essentially constructed, by cyclically calculating the value of $$\ddot{\phi}+\{\omega_o^2(X\phi_o-\phi)-2\omega_o\zeta\dot{\phi}\}\Delta t$$

at a minute cycle time $\Delta t$, so as to cyclically renew the value of $\dot{\phi}$ by the newly calculated value such as $$\dot{\phi}(t+\Delta t)=\dot{\phi}(t)+\{\omega_o^2(X\phi_o-\phi(t))-2\omega_o\zeta\dot{\phi}(t)\}\Delta t$$

with a similar simultaneous cyclic renewing calculation of $\phi$ such as:

$$\phi(t+\Delta t)=\phi(t)+\dot{\phi}(t)\Delta t$$

Then, the calculation block 16 divides the change rate $\dot{\phi}$ of the roll angle thus obtained by a limit value $\dot{\phi}_{limit}$ predetermined therefor as an allowable limit thereof, so as to output $\dot{\phi}/\dot{\phi}_{limit}$ as a quantity (fourth quantity) for evaluating thee magnitude of the changing speed of the roll angle in reflection of the allowable limit. In this connection, it will be noted that the roll angle $\phi$ obtained in the above calculation process is also usable as a static roll composition instead of $\gamma V$, Gy and Ff, although $\phi$ is later than $\gamma V$, Gy and Ff in the phase of changing, and therefore will be less favorable than $\gamma V$, Gy and Ff in estimating the rolling condition of the vehicle body.

The device may further comprise a judgment block 18 adapted to be supplied with the yaw rate $\gamma$, the vehicle speed V and the lateral acceleration Gy from the yaw rate sensor 22, the vehicle speed sensor 24 and the lateral acceleration sensor 26, respectively, so as to output certain judgments toward an estimation block 20 as described hereinunder.

The judgments made by the judgment block 18 and the functions of the estimation block 20 will be described hereinunder with reference to FIGS. 2–6.

The calculation blocks 10–16, the judgment block 18 and the estimation block 20 are indeed constructed as certain functional parts of a micro-computer which may be of a conventional type including a central processor unit (CPU), a read only memory (ROM), a random access memory (RAM), input and output port means and a bilateral common bus interconnecting these components.

Figure 2:
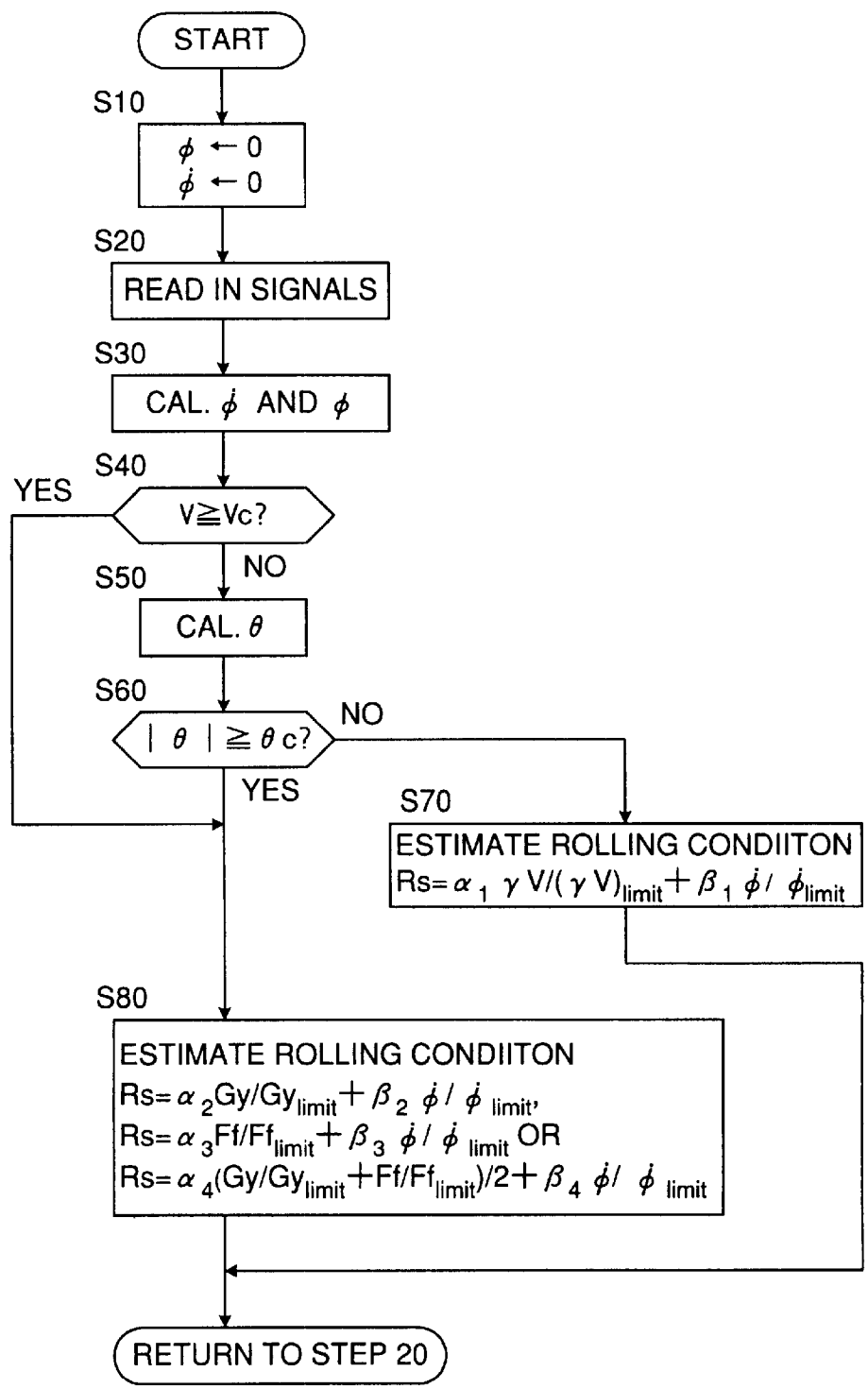
FIG. 2 is a flowchart showing a process of operating several embodiments of the rolling condition estimation device according to the present invention in combination.

Referring to FIG. 2, the processes shown as steps of a flowchart are successively carried out so as to repeat the cycle therethrough by a minute cycle time such as tens of micro-seconds during the operation of the rolling condition estimation device according to the present invention which may be put into operation by a closure of an ignition switch (not shown) of the vehicle in which the device is mounted.

When the operation is started, in step 10, all variables including $\phi$, $\dot{\phi}$ are initialized to zero.

In step 20, signals bearing the yaw rate $\gamma$ and others are read in from the corresponding sensors.

In step 30, $\dot{\phi}/\dot{\phi}_{limit}$ is calculated by the calculation block 16 as described above.

In step 40, it is judged if the vehicle speed V is equal to or larger than a threshold value Vc predetermined therefor.

Vc is a vehicle speed above which it is anticipated that there will occur a substantial discrepancy between the value of $\gamma V$ calculated based upon the yaw rate and the vehicle speed and the actual lateral acceleration actually applied to the vehicle body. The judgment in this step is made by the judgment block 18.

When the answer is no, the control proceeds to step 50, and the lateral inclination of the road surface is estimated based upon the values $\gamma$, V and Gy such as cos $\theta$=Gy/$\gamma V$.

In step 60, it is judged if the absolute value of $\theta$ is equal to or larger than a threshold value $\theta c$ which is a limit value of $\theta$ determined to judge that the road surface is not virtually laterally inclined. The calculation of $\theta$ and the judgment in step 60 may also be made by the judgment block 18.

When the answer is no, i.e. when the vehicle is not running at such a high speed as to cause a substantial discrepancy in estimating the lateral acceleration by $\gamma V$ and the road surface is not so substantially laterally inclined as to cause a substantial error in estimating the lateral acceleration by $\gamma V$, the control proceeds to step 70, and the rolling condition Rs is estimated as $$Rc=\alpha_1\gamma V/(\gamma V)_{limit}+\beta_1\dot{\phi}/\dot{\phi}_{limit}$$

by using $\gamma V/(\gamma V)_{limit}$ output from the calculation block 10 as the static roll component and $\dot{\phi}/\dot{\phi}_{limit}$ output from the calculation block 16 as the dynamic roll component, with appropriate weighting or coordinating factors $\alpha_1$ and $\beta_1$ for providing a most desirable rolling estimation in view of the balance between the static roll component and the dynamic roll component. Then the control returns to step 20.

When the answer of step 40 or the answer of step 60 is yes, the control proceeds to step 80, and the rolling condition Rc is estimated as $$Rc=\alpha_2Gy/Gy_{limit}+\beta_2\dot{\phi}/\dot{\phi}_{limit},$$

$$Rc=\alpha_3Ff/Ff_{limit}+\beta_3\dot{\phi}/\dot{\phi}_{limit} \text{ or}$$

$$Rc=\alpha_4(Gy/Gy_{limit}+Ff/Ff_{limit})/2+\beta_4\dot{\phi}/\dot{\phi}_{limit}$$

by using $Gy/Gy_{limit}$ or $Ff/Ff_{limit}$ output from the calculation block 12 or 14 or by taking a mean of the two such as $(Gy/Gy_{limit}+Ff/Ff_{limit})/2$ as the static roll component and $\dot{\phi}/\dot{\phi}_{limit}$ output from the calculation block 16 as the dynamic roll component, with appropriate weighting or coordinating factors $\alpha_2$, $\alpha_3$ or $\alpha_4$ and $\beta_2$, $\beta_3$ or $\beta_4$, respectively, similar to $\alpha_1$ and $\beta_1$. Then the control returns to step 20.

Figure 3:
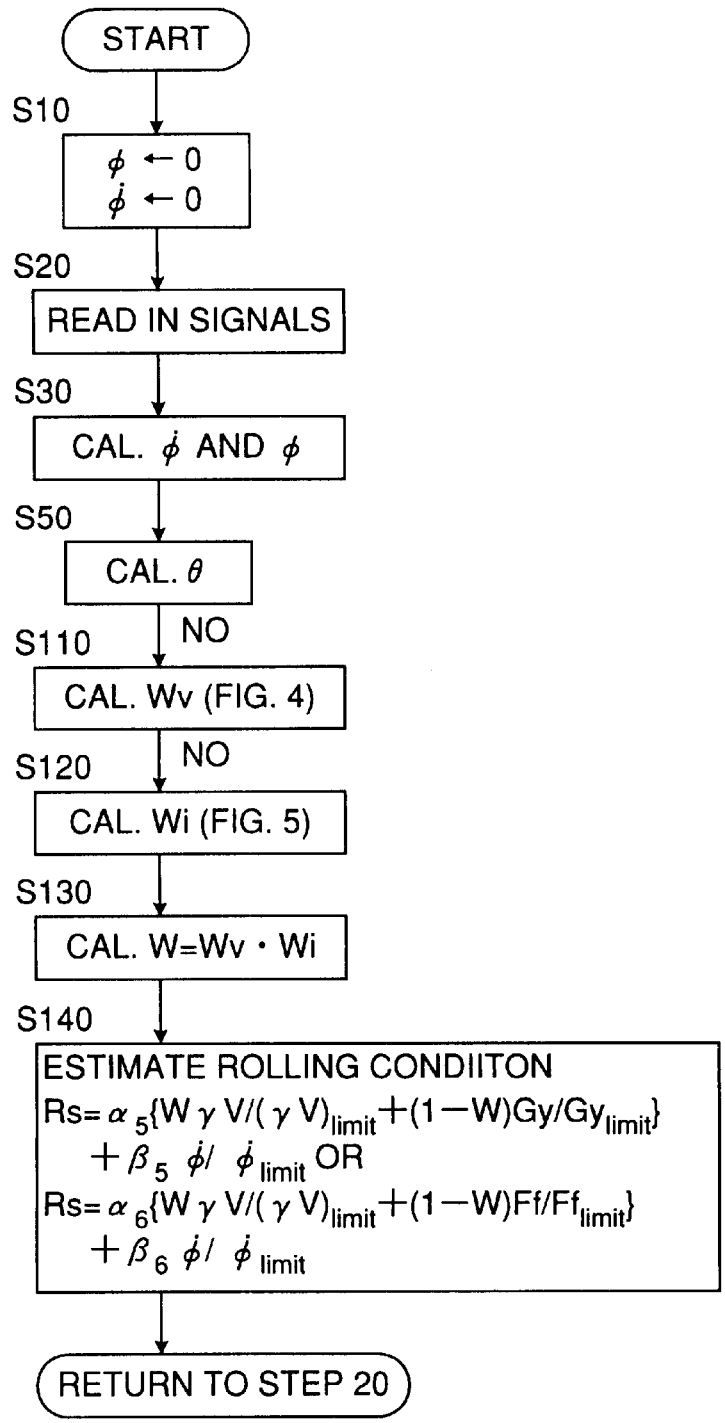
FIG. 3 is a flowchart showing a process of operating still another embodiment of the rolling condition estimation device according to the present invention in combination.

FIG. 3 shows still another embodiment of the rolling condition estimation device according to the present invention in the same manner as FIG. 2. In the flowchart of FIG. 3, steps 10, 20, 30 and 50 are the same as the corresponding steps of the flowchart of FIG. 2. In this embodiment, step 50 for calculating the angle of lateral inclination of the road surface is carried out without judging if the vehicle speed V is equal to or larger than any threshold value.

Figure 4:
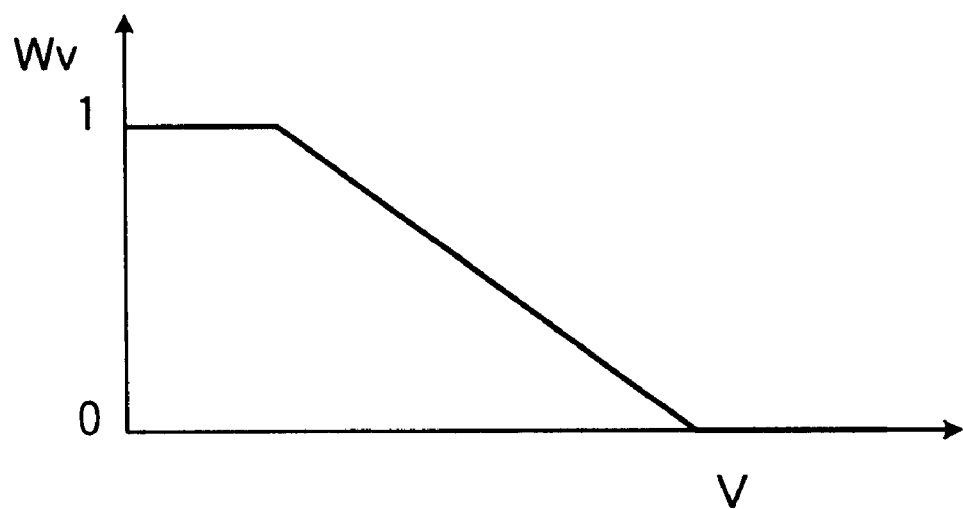
FIGS. 4 and 5 are maps showing the relationships of some parameters incorporated in the calculation process of the flowchart of FIG. 3.

Then, in this embodiment, in step 110, a weighting factor Wr is calculated based upon the vehicle speed V by looking up a map such as shown in FIG. 4, so as to be gradually decreased from a value of 1 along with increase of the vehicle speed V.

Figure 5:
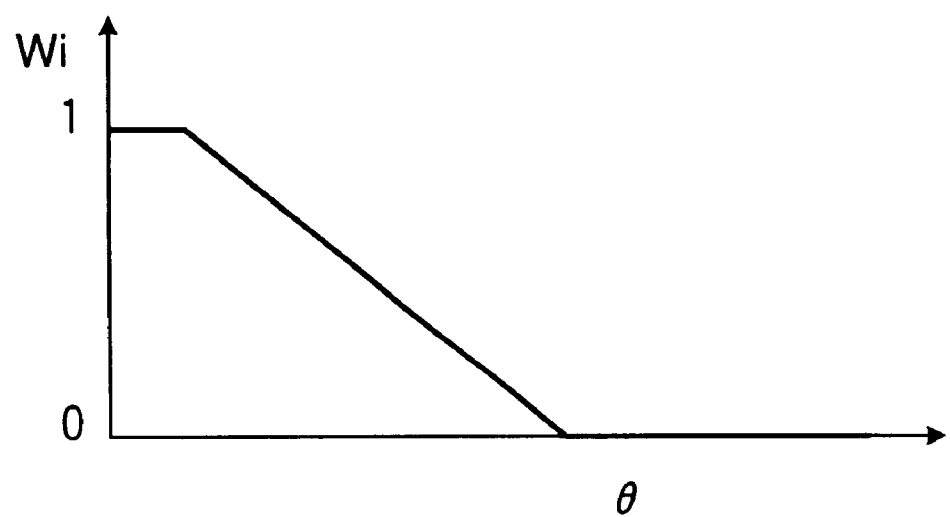

In step 120, another weighting factor Wi is calculated based upon the value of the road surface lateral inclination angle $\theta$ by looking up a map such as shown in FIG. 5, so as to be gradually decreased from a value of 1 along with increase of the angle $\theta$.

In step 130, the weighting factors Wr and Wi are multiplied with one another to produce a final weighting factor W for weighting the calculation of the static roll component on between $\gamma V/(\gamma V)_{limit}$ and $Gy/Gy_{limit}$ or on between $\gamma V/(\gamma V)_{limit}$ and $Ff/Ff_{limit}$ such that the weight of the static roll component $\gamma V/(\gamma V)_{limit}$ is gradually decreased relative to that of the static roll component $Gy/Gy_{limit}$ or $Ff/Ff_{limit}$ along with increase of either of both of the vehicle speed V and the lateral inclination θ of the road surface.

Then in step 140, the rolling condition is estimated as:

$$Rc = \alpha_5\{W\gamma V/(\gamma V)_{limit} + (1-W)Gy/Gy_{limit}\} + \beta_5 \dot{\phi}/\dot{\phi}_{limit} \text{ or}$$

$$Rc = \alpha_6\{W\gamma V/(\gamma V)_{limit} + (1-W)FF/Ff_{limit}\} + \beta_6 \dot{\phi}/\dot{\phi}_{limit}$$

Then the control returns to step 20.

Figure 6:
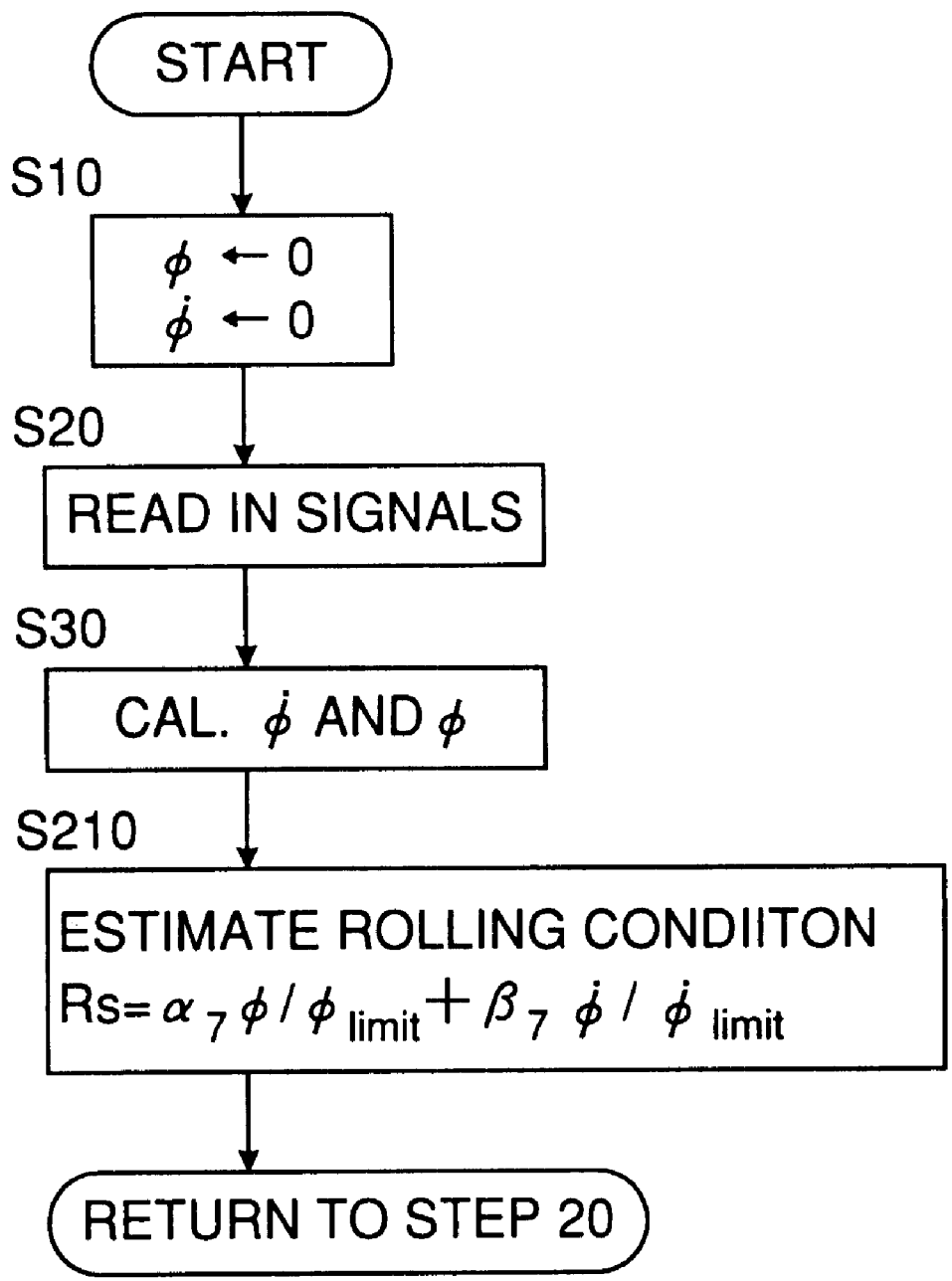
FIG. 6 is a flowchart showing a process of operating still further embodiment of the rolling condition estimation device according to the present invention.

FIG. 6 shows still another embodiment of the rolling condition estimation device according to the present invention in the same manner as FIGS. 2 and 3. In the flowchart of FIG. 6, steps 10, 20 and 30 are the same as the corresponding steps of the flowcharts of FIGS. 2 and 3. In this embodiment, in step 210 the rolling condition Rc is estimated as $$Rc = \alpha_7 \phi/\phi_{limit} + \beta_7 \dot{\phi}/\dot{\phi}_{limit}$$

by calculating $\phi/\phi_{limit}$ based upon $\phi$ available in the calculation of $\phi$ carried out by the calculation block 16 by dividing it by an allowable limit $\phi_{limit}$ determined therefor as the static roll component and combining it with the dynamic roll component $\dot{\phi}/\dot{\phi}_{limit}$, with similar appropriate weighting or coordinating factors $\alpha_7$ and $\beta_7$. However, as already note, the static roll component $\phi/\phi_{limit}$ is later than any of the static roll components $V/(\gamma V)_{limit}$, $Gy/Gy_{limit}$ and $Ff/Ff_{limit}$ in the phase of changing Although the present invention has been described in detail with respect to several preferred embodiments thereof, it will be apparent for those skilled in the art that various modifications are possible with respect to the shown embodiments without departing from the spirit of the present invention.

What is claimed is:

1. A device for estimating a rolling condition of a body of a vehicle having the vehicle body, a pair of front wheels, a pair of rear wheels, and suspension means for supporting the vehicle body on the pairs of front and rear wheels, the vehicle body being able to roll relative to the wheels around a virtual axis of rolling provided by the suspension means, the device comprising:

means for estimating a first quantity corresponding to roll angle of the vehicle body around the rolling axis with a selection from a plurality of parameters for representing the roll angle according to running conditions of the vehicle, the plurality of parameters being different in an earliness in a phase of changing thereof and susceptibleness to an error caused by at least one of vehicle speed and lateral inclination of road surface;

means for estimating a second quantity corresponding to a change rate of the roll angle of the vehicle body;

means for estimating a third quantity indicating a relative magnitude of the first quantity with reference to a first limit value predetermined therefor;

means for estimating a fourth quantity indicting a relative magnitude of the second quantity with reference to a second limit value predetermined therefor; and means for estimating the rolling condition as a combination of the third and fourth quantities such that the rolling condition is intensified along with increase of the third quantity as well as increase of the fourth quantity.

2. A device according to claim 1, comprising means for detecting at least one selected from the group consisting of lateral acceleration Gy of the vehicle body, a combination yaw rate γ of the vehicle body and vehicle speed V and a combination of yaw rate γ and lateral acceleration Gy of the vehicle body, wherein the means for estimating the fourth quantity comprise means for cyclically conducting renewing calculations as follows $$\dot{\phi}(t+\Delta t) = \dot{\phi}(t) + \{\omega_o^2(X\phi_o - \phi(t)) - 2\omega_o\zeta\dot{\phi}(t)\}\Delta t \text{ and}$$

$$\phi(t+\Delta t) = \phi(t) + \dot{\phi}\Delta t$$

at a minute cycle time Δt of time t so as to cyclically renew values of $\dot{\phi}$ and $\phi$ by respective newly calculated values thereof and to estimate the fourth quantity by dividing each instant value of $\dot{\phi}$ by a limit value $\dot{\phi}_{limit}$ predetermined therefor, wherein $\phi$ is the roll angle of the vehicle body around the rolling axis, $\dot{\phi}$ is change rate of the roll angle $\phi$, $\omega_o$ is a natural frequency of the vehicle body in rolling around the rolling axis in oscillation, X is one selected from the group consisting of γV, Gy and Ff representing (I γ+LrMGy)/H, $\phi_o$ is a roll angle induced in the vehicle body by a unit value of the one selected from the group consisting of γV, Gy and Ff, and ζ is a damping coefficient in the rolling of the vehicle body around the rolling axis, while I, Lr, M and H are the inertial moment of the vehicle body in yawing around the center of gravity, Thereof, a distance between the axis of the rear wheels and the center of gravity of the vehicle body, the mass of the vehicle body, and the wheel base of the vehicle, respectively.

3. A device according to claim 2, wherein the means for estimating the third quantity estimates the third quantity by dividing one selected from the group consisting of $\phi$, γV, Gy and Ff by either one of limit values $\phi_{limit}$, $(\gamma V)_{limit}$, $Gy_{limit}$ and $Ff_{limit}$ correspondingly predetermined therefor.

4. A device according to claim 2, comprising all of the means for detecting the yaw rate γ, the vehicle speed V and the lateral acceleration Gy, and means for calculating lateral inclination θ of road surface based upon a difference between γV and Gy, wherein the means for estimating the fourth quantity comprise means for cyclically conducting renewing calculations as follows $$\dot{\phi}(t+\Delta t) = \dot{\phi}(t) + \{\omega_o^2(\gamma V\phi_o - \phi(t)) - 2\omega_o\zeta\dot{\phi}(t)\}\Delta t \text{ and}$$

$$\phi(t+\Delta t) = \phi(t) + \dot{\phi}(t)\Delta t$$

and also means for cyclically conducting such renewing calculations as follows $$\dot{\phi}(t+\Delta t) = \dot{\phi}(t) + \{\omega_o^2(Gy\phi_o - \phi(t)) - 2\omega_o\zeta\dot{\phi}(t)\}\Delta t \text{ and}$$

$$\phi(t+\Delta t) = \phi(t) + \dot{\phi}(t)\Delta t$$

at a minute cycle time Δt of time t so as to cyclically renew values of $\dot{\phi}$ and $\phi$ by respective newly calculated values thereof and to estimate the fourth quantity by dividing each instant value of $\dot{\phi}$ by a limit value $\dot{\phi}_{limit}$ it predetermined therefor, wherein $\phi_o$ is a roll angle induced in the vehicle body by a unit value of either γV or Gy corresponding thereto, the device further comprising means for selecting the means for estimating the fourth quantity based upon the cyclical renewing calculations of $$\dot{\phi}(t+\Delta t) = \dot{\phi}(t) + \{\omega_o^2(\gamma V\phi_o - \phi(t)) - 2\omega_o\zeta\dot{\phi}(t)\}\Delta t \text{ and}$$

$$\phi(t+\Delta t) = \phi(t) + \dot{\phi}(t)\Delta t$$

when the vehicle speed V is not larger than a threshold value Vc predetermined therefor and the lateral inclination θ of the road surface is not larger than a threshold value θc predetermined therefor, while otherwise selecting the means for estimating the fourth quantity based upon the cyclical renewing calculations of:

$$\dot{\phi}(t+\Delta t)=\dot{\phi}(t)+\{\omega_o^2(Gy\phi_o-\phi(t))-2\omega_o\zeta\dot{\phi}(t)\}\Delta t \text{ and}$$

$$\phi(t+\Delta t)=\phi(t)+\dot{\phi}(t)\Delta t.$$

5. A device according to claim 4, wherein the means for estimating the third quantity estimates the third quantity by dividing the product γV by a limit value $(\gamma V)_{limit}$ predetermined therefor when the vehicle speed V is not larger than a threshold value Vc predetermined therefor and the lateral inclination θ of the road surface is not larger than a threshold value θc predetermined therefor, while otherwise estimating the third quantity by dividing the lateral acceleration Gy by a limit value $Gy_{limit}$ predetermined therefor.

6. A device according to claim 2, comprising all of the means for detecting the yaw rate γ, the vehicle speed V and the lateral acceleration Gy, and means for calculating lateral inclination θ of road surface based upon a difference between γV and Gy, wherein the means for estimating the fourth quantity comprise means for cyclically conducting renewing calculations as follows $$\dot{\phi}(t+\Delta t)=\dot{\phi}(t)+\{\omega_o^2(\gamma V\phi_o-\phi(t))-2\omega_o\zeta\dot{\phi}(t)\}\Delta t \text{ and}$$

$$\phi(t+\Delta t)=\phi(t)+\dot{\phi}(t)\Delta t$$

and also means for cyclically conducting renewing calculations as follows $$\dot{\phi}(t+\Delta t)=\dot{\phi}(t)+\{\omega_o^2(Ff\phi_o-\phi(t))-2\omega_o\zeta\dot{\phi}(t)\}\Delta t \text{ and}$$

$$\phi(t+\Delta t)=\phi(t)+\dot{\phi}(t)\Delta t$$

at a minute cycle time Δt of time t so as to cyclically renew values of $\dot{\phi}$ and $\phi$ by respective newly calculated values thereof and to estimate the fourth quantity by dividing each instant value of $\dot{\phi}$ by a limit value $\dot{\phi}_{limit}$ predetermined therefor, wherein $\phi_o$ is a roll angle induced in the vehicle body by a unit value of either γV or Ff corresponding thereto, the device further comprising means for selecting the means for estimating the fourth quantity based upon the cyclical renewing calculations of $$\dot{\phi}(t+\Delta t)=\dot{\phi}(t)+\{\omega_o^2(\gamma V\phi_o-\phi(t))-2\omega_o\zeta\dot{\phi}(t)\}\Delta t \text{ and}$$

$$\phi(t+\Delta t)=\phi(t)+\dot{\phi}(t)\Delta t$$

when the vehicle speed V is not larger than a threshold value Vc predetermined therefor and the lateral inclination θ of the road surface is not larger than a threshold value θc predetermined therefor, while otherwise selecting the means for estimating the fourth quantity based upon the cyclical renewing calculations of:

$$\dot{\phi}(t+\Delta t)=\dot{\phi}(t)+\{\omega_o^2(Ff\phi_o-\phi(t))-2\omega_o\zeta\dot{\phi}(t)\}\Delta t \text{ and}$$

$$\phi(t+\Delta t)=\phi(t)+\dot{\phi}(t)\Delta t.$$

7. A device according to claim 6, wherein the means for estimating the third quantity estimates the third quantity by dividing the product γV by a limit value $(\gamma V)_{limit}$ predetermined therefor when the vehicle speed V is not larger than a threshold value Vc predetermined therefor and the lateral inclination θ of the road surface is not larger than a threshold value θc predetermined therefor, while otherwise estimating the third quantity by dividing the Ff by a limit value $Ff_{limit}$ predetermined therefor.

8. A device according to claim 2, comprising all of the means for detecting the yaw rate γ, the vehicle speed V and the lateral acceleration Gy, and means for calculating lateral inclination θ of road surface based upon a difference between γV and Gy, means for calculating a first weighting factor Wr based upon the vehicle speed V so as to be gradually decreased along with increase of the vehicle speed, and means for calculating a second weighting factor Wi based upon the lateral inclination θ so as to be gradually decreased along with increase of the lateral inclination, wherein the means for estimating the third quantity estimates the third quantity as follows $$W\gamma V/(\gamma V)_{limit}+(1-W)Gy/Gy_{limit}$$

wherein W is a: product of Wr and Wi.

9. A device according to claim 2, comprising all of the means for detecting the yaw rate γ, the vehicle speed V and the lateral acceleration Gy, and means for calculating lateral inclination θ of road surface based upon a difference between γV and Gy, means for calculating a first weighting factor Wr based upon the vehicle speed V so as to be gradually decreased along with increase of the vehicle speed, and means for calculating a second weighting factor Wi based upon the lateral inclination θ so as to be gradually decreased along with increase of the lateral inclination, wherein the means for estimating the third quantity estimates the third quantity as follows $$W\gamma V/(\gamma V)_{limit}+(1-W)Ff/Ff_{limit}$$

wherein W is a product of Wr and Wi.

* * * * *